United States Patent
Schmidt

(10) Patent No.: US 9,308,896 B2
(45) Date of Patent: Apr. 12, 2016

(54) ELECTROMECHANICAL BRAKE POWER ASSIST UNIT

(71) Applicant: Bayerische Motoren Werke Aktiengesellschaft, Munich (DE)

(72) Inventor: Roland Schmidt, Stockdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 67 days.

(21) Appl. No.: 14/180,668

(22) Filed: Feb. 14, 2014

(65) Prior Publication Data

US 2014/0159475 A1    Jun. 12, 2014

Related U.S. Application Data

(63) Continuation of application No. PCT/EP2012/063506, filed on Jul. 10, 2012.

(30) Foreign Application Priority Data

Aug. 16, 2011    (DE) .......................... 10 2011 081 001

(51) Int. Cl.
*B60T 7/04* (2006.01)
*B60T 7/06* (2006.01)
(Continued)

(52) U.S. Cl.
CPC . *B60T 7/06* (2013.01); *B60T 7/042* (2013.01); *B60T 7/107* (2013.01); *B60T 11/18* (2013.01); *B60T 13/66* (2013.01); *B60T 13/745* (2013.01); *B60T 13/746* (2013.01)

(58) Field of Classification Search
CPC ......... B60T 13/745; B60T 7/06; B60T 7/042; B60T 11/18
See application file for complete search history.

(56) References Cited

U.S. PATENT DOCUMENTS 3,064,431 A * 11/1962 Schnell ........................... 60/548
3,327,479 A *  6/1967 Harness et al. ................. 60/550
(Continued)

FOREIGN PATENT DOCUMENTS

CN    1429160 A    7/2003
DE   39 04 616 A1  8/1989
(Continued)

OTHER PUBLICATIONS

Machine translation of DE 10 2005 036 922, retrieved Jun. 28, 2015.*
(Continued)

*Primary Examiner* — Bradley King
(74) *Attorney, Agent, or Firm* — Crowell & Moring LLP

(57) ABSTRACT

An electromechanical brake power assist unit of a vehicle braking system has a master brake cylinder with a piston rod, displaceable by a brake pedal and, in the process, building up brake pressure. The piston rod is also displaceable by an electric motor. The piston rod is supported on a pedal lever, which is formed by the brake pedal itself or an intermediate element pivotable about an axis of rotation by the brake pedal. The piston rod is displaced by a pivotal movement of the pedal lever. An axis of rotation of the pedal lever is displaceable by the electric motor in a moving direction of the piston rod. The pedal ratio is selected such that the driver can slightly displace the piston rod by forces customary in the case of a conventional effective brake power assistance also without an activation of the electric motor, and the pedal path which is large, because of such a pedal ratio without an activation of the electric motor, will then be reduced to a normal extent by the electric-motor-driven displacement of the pedal lever axis rotation.

11 Claims, 4 Drawing Sheets

(51) Int. Cl.
  *B60T 7/10*  (2006.01)
  *B60T 11/18*  (2006.01)
  *B60T 13/74*  (2006.01)
  *B60T 13/66*  (2006.01)

(56) References Cited

U.S. PATENT DOCUMENTS

| 4,078,385 | A | * | 3/1978 | Zabadneh | 60/548 |
| 8,365,879 | B2 | | 2/2013 | Schmidt | |
| 2003/0056615 | A1 | | 3/2003 | Oberheide et al. | |
| 2007/0251231 | A1 | * | 11/2007 | Arnold | 60/545 |
| 2010/0126167 | A1 | | 5/2010 | Nagel et al. | |
| 2011/0160972 | A1 | * | 6/2011 | Crombez et al. | 701/70 |
| 2013/0333377 | A1 | * | 12/2013 | Feuerrohr et al. | 60/545 |

FOREIGN PATENT DOCUMENTS

| DE | 197 23 394 A1 | 12/1997 |
| DE | 10 2005 036 922 A1 | 3/2007 |
| DE | 10 2007 018 469 A1 | 10/2008 |
| DE | 10 2008 037 923 A1 | 2/2010 |
| DE | 10 2008 057 576 A1 | 5/2010 |
| DE | 10 2009 027 480 A1 | 1/2011 |
| DE | 10 2009 031 918 A1 | 1/2011 |
| GB | 2 313 885 A | 12/1997 |
| JP | 59-29550 A | 2/1984 |
| JP | 59-106357 A | 6/1984 |
| WO | WO 2012/016639 A1 | 2/2012 |

OTHER PUBLICATIONS

Machine translation of DE 10 2009 027480, retrieved Jun. 28, 2015.*
Chinese Office Action dated May 22, 2015 with English-language translation (eight (8) pages).
German Search Report dated Mar. 14, 2012 with partial English translation (ten (10) pages).
International Search Report dated Nov. 2, 2012 with English translation (seven (7) pages).
Chinese Office Action issued in counterpart Chinese Application No. 201280028457.2 dated Sep. 9, 2015 with English translation (five pages).

* cited by examiner

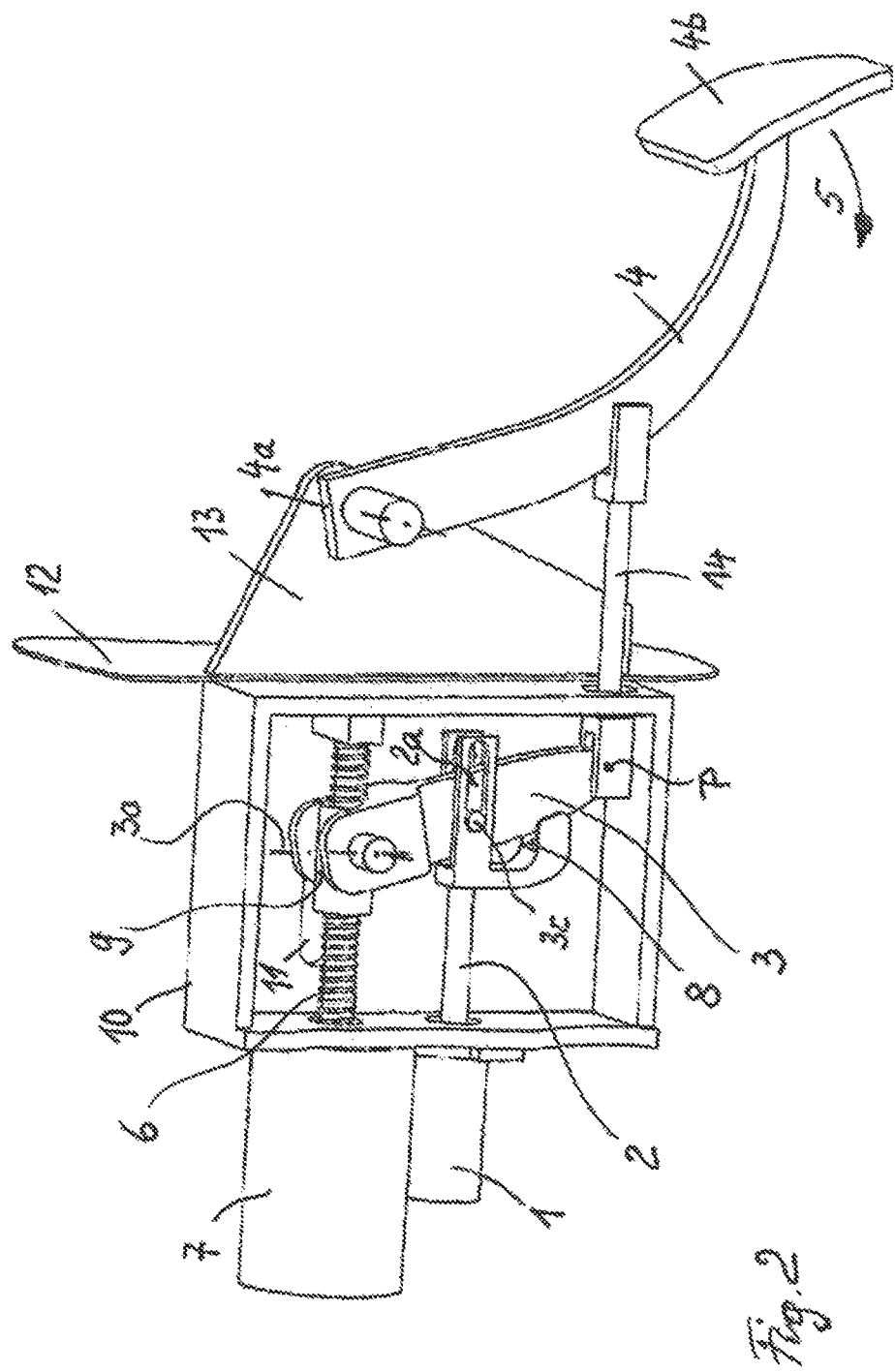

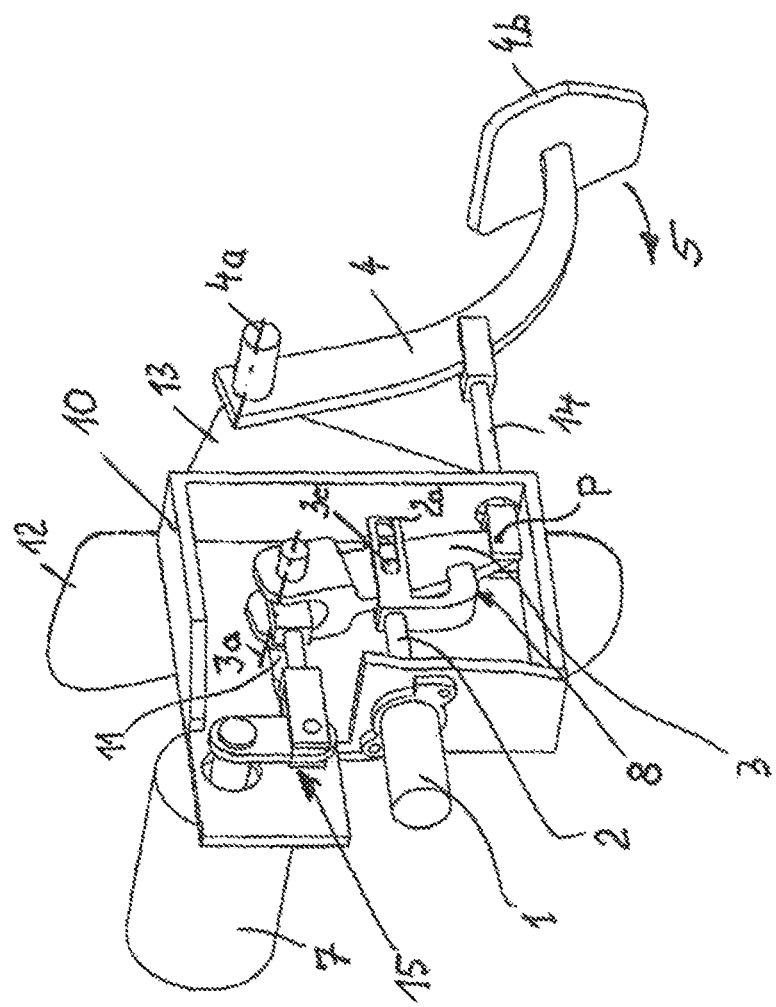

ELECTROMECHANICAL BRAKE POWER ASSIST UNIT

CROSS REFERENCE TO RELATED APPLICATIONS

This application is a continuation of PCT International Application No. PCT/EP2012/063506, filed Jul. 10, 2012, which claims priority under 35 U.S.C. §119 from German Patent Application No. 10 2011 081 001.3, filed Aug. 16, 2011, the entire disclosures of which are herein expressly incorporated by reference.

BACKGROUND AND SUMMARY OF THE INVENTION

The invention relates to an electromechanical brake power assist unit of a vehicle braking system having a master brake cylinder with a piston rod, which can be displaced by way of a brake pedal and, in the process, builds up or reduces brake pressure. The piston rod can also be displaced by way of an electric motor, in which case this single electric motor is activated as a function of the pedal path or the pivot angle of the brake pedal pivotally suspended about an axis of rotation such that the effort to be applied by the driver of the vehicle to the brake pedal for the building-up of brake pressure is less than the effort required without the assistance by the electric motor for the corresponding displacement of the piston rod.

With respect to the state of the art, in addition to German Patent document DE 10 2008 057 576 A1, which describes principles by means of an electro-hydraulic brake power assist unit, and in addition to German Patent document DE 10 2005 036 922 A1, in which a brake pedal mechanism with a changeable transmission ratio is shown, reference is particularly made to German Patent document DE 10 2009 031 918 A1. This last-mentioned document shows an example of the customary principle of electromechanical brake power assist units, according to which the usually single electric motor applying an assisting power acts directly upon the piston rod of the master brake cylinder.

Brake power assist units in vehicle passenger cars even today are still designed mostly as vacuum brake power assist units and use a vacuum for generating the assisting force, which, in case of earlier vehicle drive assemblies in the form of quantity-controlled internal-combustion engines, was available as a quasi "waste product". In the case of today's modern vehicle drive assemblies, this energy source is no longer or only insufficiently available. An additional vacuum pump is therefore provided in order to be able to continue to use the conventional vacuum brake power assist units. This requires relatively high expenditures; in addition, the relatively high space requirement of a vacuum brake power assist unit is a disadvantage. As an alternative, a hydraulic or an electromechanical brake power assist unit can be used.

The demands made on such, in particular, electro-hydraulic or electromechanical brake power assist units, are very high. The reason is that, on the one hand, these brake power assist units have to meet the highest safety demands and, also in the event of a failure of, for example, an electric component or the like, should still permit a secure braking of the vehicle by the driver. On the other hand, the so-called pedal feel, which the driver of the motor vehicle experiences when actuating his brake pedal, should be as comparable as possible to the pedal feel to which he is accustomed from vacuum brake power assist units, with a harmonious assignment between the pedal force and the pedal path. For a good brake pedal feel, a precise assignment of the pedal force to the pedal path is therefore necessary at least within certain limits. Good characteristic pedal force curves are therefore known from vacuum brake power assist units. An electromechanical assistance should therefore basically also be modulated very precisely simultaneously with the pedal movement. However, in this case, a high-ratio electric motor has a high inertia which limits dynamics. If, for example, the power assistance is slightly slower than the pedal movement, the brake pedal will "harden"; i.e. the assistance is too low for the pedal path and the pedal path—pedal force assignment will then no longer be on the desired characteristic pedal force curve. The same applies when the power assistance takes place too rapidly. In this case, the pedal will "fall through"; i.e. the pedal force is too low for the pedal path. When the dynamics of the actuation of a vehicle braking system are analyzed, it seems to be extremely difficult to achieve the high dynamics of the assisting electric motor that correspond to a vacuum brake power assist unit, particularly also because the brake pedal path has to be very precisely measured and has to be processed by an electronic control unit for this electric motor, before the latter can be activated.

It is an object of the present invention to provide measures for avoiding the above-described problems.

For an electromechanical brake power assist unit of a type described above, a solution is provided in that the piston rod is supported on a pedal lever, which may be formed either by the brake pedal itself or by an intermediate element that can be pivoted about an axis of rotation by way of the brake pedal, and is displaced by a pivotal movement of this pedal lever. The axis of rotation of the pedal lever is displaceable by way of the (single) electric motor essentially in the moving direction of the piston rod.

A principle of an electromechanical brake power assist unit is disclosed that fundamentally differs from the state of the art, for example, from the above-mentioned German Patent document DE 10 2009 031 918 A1, where the electric motor acts directly upon the piston rod of the master brake cylinder. Specifically, according to the present invention, the influence of the electric motor is separate from the piston rod of the master brake cylinder, similar to the also above-mentioned German Patent Document DE 10 2005 036 922 A1, which, however, shows a pneumatic or a conventional electromechanical brake power assist unit having a lever mechanism disposed in front of the brake power assist unit and having a transmission ratio that can be changed by the electric motor.

In the present case, it was recognized that, in principle, no brake power assistance is necessary when the pedal transmission ratio is selected to be sufficiently large. However, in practice, this had the result that the required pedal path can neither be generated by the driver's physiologically possible foot path, nor can be accommodated in a conventional foot well of a motor vehicle, for example, a passenger car. In the present case, the single electric motor is therefore provided for controlling the pedal path to a conventional extent and nevertheless providing a high pedal transmission ratio. According to the invention, the electric motor provides no assisting power in the actual sense for this purpose but quasi-assistance work which, as known, is physically defined as a mathematical product of force and path. By means of the use according to the invention of the electric motor, the effort (or work) to be carried out by the driver for building up a certain brake pressure in the hydraulic vehicle brake system is less than without the use of this electric motor. For this purpose, the electric motor changes the pedal ratio and thereby changes the path, which the driver has to produce at his brake pedal, in such a manner that the work to be performed by the driver for building up the brake pressure will be reduced. In contrast, the force which the driver has to apply for building up this brake pressure is essentially equally high with the use and without the use of this electric motor.

In this sense, the above-mentioned pedal ratio, which is defined as the ratio of the distance between the axis of rotation of the pedal lever and the driver's force introduction point and the distance between the above-mentioned axis of rotation and the supporting point of the piston rod, which is situated on the pedal lever between its axis of rotation and the above-mentioned force introduction point, is preferably selected such that the driver can slightly displace the piston rod by use of forces customary in the case of a conventional effective brake power assistance also without an activation of the electric motor. Simultaneously, the pedal path, which is unusually large because of such a pedal ratio without an activation of the electric motor, will then be reduced to a normal extent by the suitable electric-motor-driven displacement of the axis rotation of the pedal lever, i.e. is controlled such that a desired usual pedal path is obtained.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a perspective view illustrating a modification of the electromechanical brake power assist unit according to the first embodiment; and FIG. 3 is a perspective view illustrating a modification of the electromechanical brake power assist unit according to the first embodiment.

DETAILED DESCRIPTION OF THE DRAWINGS

FIGS. 1-3 are various perspective views of an electromechanical brake power assist unit, wherein only the pertinent aspects are shown.

Figure 1A:
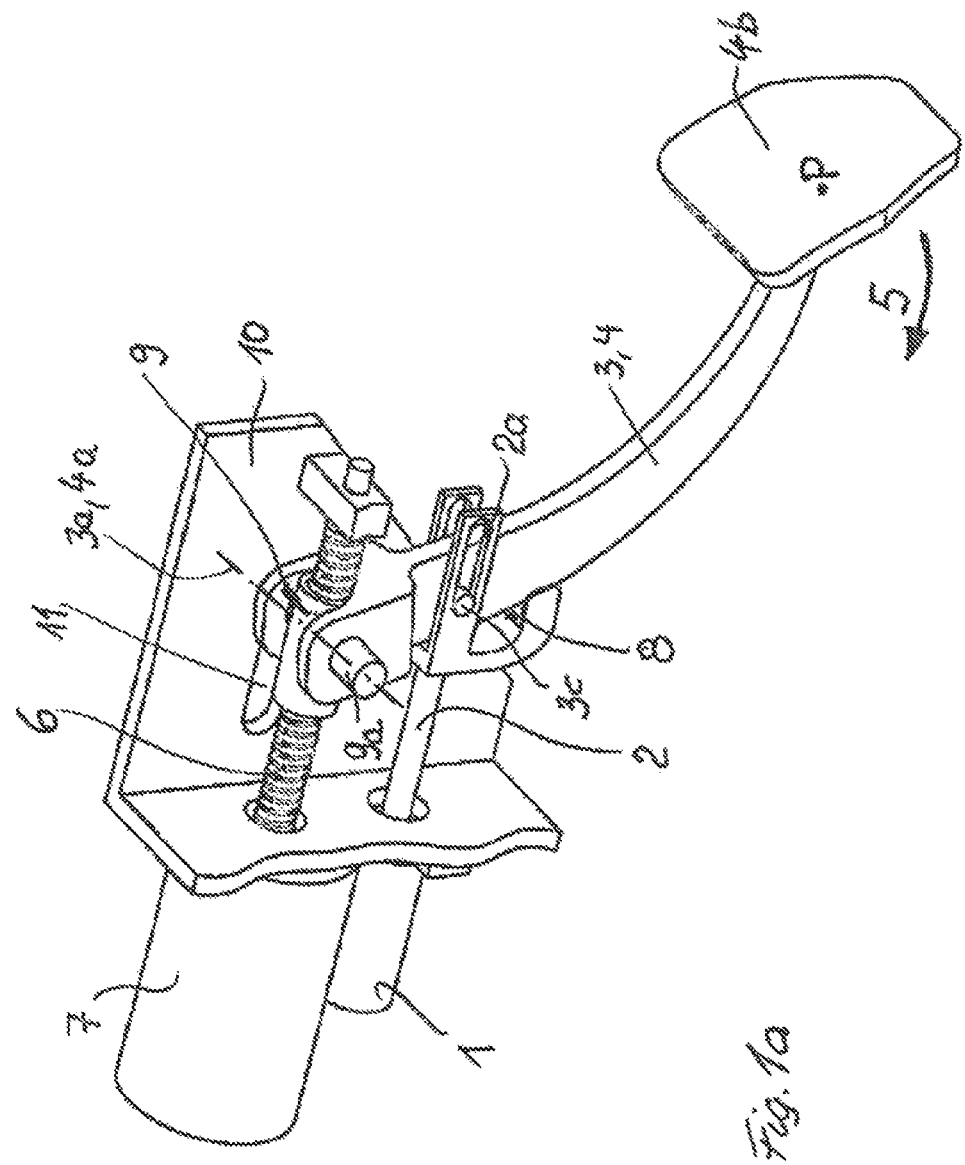
FIGS. 1a and 1b are perspective views of a first embodiment of an electromechanical brake power assist unit according to the invention.

With reference to FIG. 1a, reference number 1 denotes a master brake cylinder of a conventionally constructed hydraulic vehicle brake system. Following the master brake cylinder 1, the piston rod of the master cylinder 1 is denoted by the reference number 2. By displacing this piston rod 2 into the master brake cylinder 1, a (hydraulic) brake pressure is built up in the latter as well as in the brake system, which brake pressure is reduced again when the piston rod 2 is displaced back out of the master brake cylinder 1.

Figure 1B:
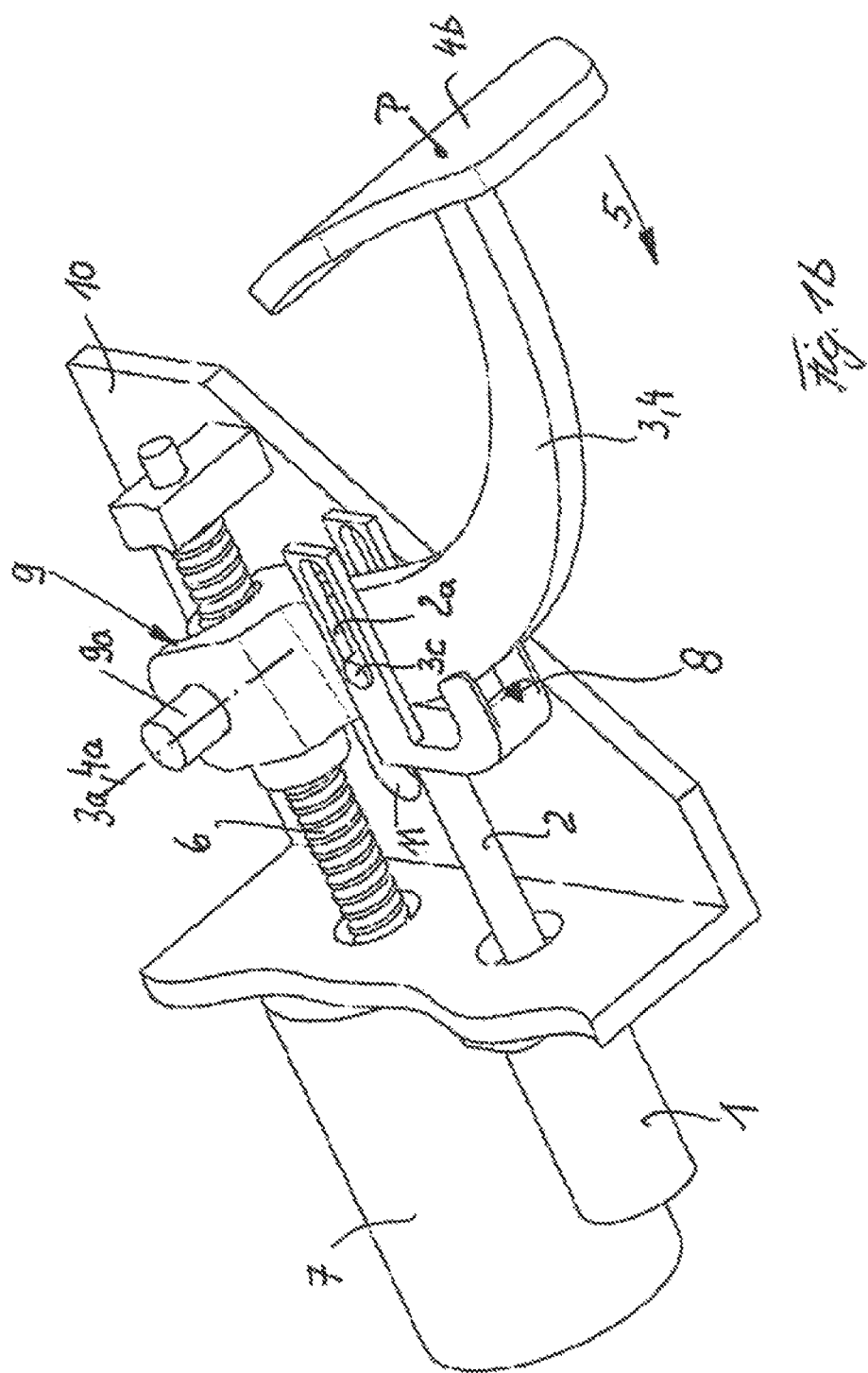

With its free end section, i.e. the end section facing away from the master brake cylinder 1 or projecting out of the latter, the piston rod 2 is supported on a so-called pedal lever 3. The pedal lever 3, in the embodiment according to FIGS. 1a, 1b, is formed by a brake pedal 4 itself, i.e. the pedal lever 3 is equal to the so-called pedal arm of the brake pedal 4. The pedal arm represents the connection between the pedal plate 4b of the brake pedal 4 and the axis of rotation 4a of the brake pedal 4, on which pedal arm, the brake pedal 4 is suspended in a basically conventional pivotable manner. As a result of the equality of the pedal lever 3 and the brake pedal 4, in the present case, an axis of rotation 3a of the pedal lever 3, on which the brake pedal 4 is pivotably suspended, is equal to the axis of rotation 4a of the brake pedal 4.

For supporting the piston rod 2 on the pedal lever 3, a pedal bolt 3c is provided on each side of the pedal lever 3. The pedal bolt 3c engages in a guide link 2a provided at the free end section of the piston rod 2 in a so-called fork head of the piston rod 2. The guide link 2a in the present case is designed essentially in the shape of an oblong hole and represents a sliding block guide. In the condition illustrated in the figures, each pedal bolt 3c rests against the end of the guide link that faces the master cylinder 1. The guide link 2a extends essentially in the moving direction of the piston rod 2.

When therefore, starting from the condition illustrated in the figures, the pedal lever 3 or the brake pedal 4, because of pressure upon the pedal plate 4b, is pivoted according to the direction of the arrow 5 in the direction toward the master brake cylinder 1, the piston rod 2 is thereby displaced farther into the master brake cylinder 1 and brake pressure is thereby built up. The so-called pedal ratio, which, as the ratio of the distance between the axis of rotation 3a of the pedal lever 3 and the driver's force introduction point P, which, in the present case, in the first embodiment according to FIGS. 1a, 1b, is in or on the pedal plate 4b, to the distance between the above-mentioned axis of rotation 3a and the supporting point of the piston rod 2, which is situated on the pedal lever 3 between its axis of rotation 3a and the above-mentioned force introduction point P and is defined by the pedal bolt or bolts 3c, is selected such that the driver can displace the piston rod 2 by applying a force customary with respect to its amount, in the case of vehicle brake systems. However, since by means of such a dimensioning of the pedal ratio, which essentially is the result of a suitable arrangement of the supporting point of the piston rod 2 at the pedal lever 3 and, in this case, by the placing of the pedal bolts 3c, by using a conventional master brake cylinder 1, a disproportionately long pedal path would be obtained when a desired customary brake pressure is to be built up. According to the present invention, the axis of rotation 3a or 4a, about which the pedal lever 3 or the brake pedal 4 can be pivoted, or at which the pedal lever 3 or the brake pedal 4 is suspended, can be displaced essentially in the displacement direction of the piston rod 2.

In the embodiment according to FIG. 1a, 1b, for such a displacement of the axis of rotation 3a and 4a respectively, this axis of rotation 3a/4a in the form of a corresponding joint 9 is disposed on a threaded spindle 6 in the form of a ball screw. In this case, this threaded spindle 6 can be caused to rotate by way of an electric motor 7. This electric motor 7 is activated and caused to rotate in such a manner by a control unit (not shown in the figures), which measures the driver's braking intention, preferably by way of the signals of an angle-of-rotation sensor of the brake pedal, that the pedal path which the driver has to overcome for building-up a desired brake pressure, will be of a usual size. This pedal path can also be described by way of the pivoting angle of the brake pedal 4 in the axis of rotation 4a, but, as an alternative, also by way of the distance which the pedal plate 4b covers essentially in the horizontal direction, i.e. essentially in the displacement direction of the piston rod 2 when the brake pedal is actuated by the driver. According to the invention, the single electric motor 7 is therefore controlled with respect to the pedal path and not—as customary in the state of the art—with respect to the supporting force to be applied.

Naturally, the joint 9 forming the axis of rotation 3a and 4a respectively, which is disposed on the threaded spindle 6, is also guided in an appropriate manner so that a rotation of the threaded spindle 6 also actually causes a longitudinal displacement of the joint 9 on the threaded spindle 6. For this guidance, one oblong hole 11 respectively extending in the longitudinal direction of the threaded spindle 6 is provided in a suitably designed supporting device 10, shown here in a broken-open fashion, of this electromechanical brake power assist unit on both sides of the threaded spindle 6. A guide pin 9a of the joint 9 projects into the oblong hole 11. In addition, also the master brake cylinder 1 and the electric motor 7 may be fastened to this supporting unit 10 which may, for example, as in the present case, be constructed approximately in a U-shape.

Furthermore—now also referring to FIG. 1b—the safety concept of the present electromechanical brake power assist unit will be described. Naturally, in the event of a failure of the electric motor 7 or of the electromechanical actuator of this brake power assist unit formed by this electric motor 7 and, in the present case, the spindle drive with the threaded spindle 6 (or generally, a gearing for the displacement of the axis of rotation 3a of the pedal lever 3), the axis of rotation 3a of the pedal lever 3 cannot be displaced, so that for the building-up of a higher hydraulic brake pressure, a pedal path could occur which cannot be represented. In order to prevent this, in the present case, a further so-called auxiliary support 8 is provided in the present end section of the piston rod 2, in addition to the above-explained support by way of the guide link 2a and the pedal bolt 3a. The auxiliary support 8 is constructed in the form of a stop provided at the free end of the piston rod 2 for the side or surface of the pedal arm of the brake pedal 4 or of the pedal lever 3 facing the master brake cylinder 1. This auxiliary support 8 is situated closer to the force introduction point of the brake pedal 4, i.e., in the case of the first embodiment, closer to the pedal plate 4b than the regularly effective support of the piston rod 2 by way of the guide ink 2a and the pedal bolts 3c. This arrangement has the effect that, in the event of a failure of the electromechanical actuator or electric motor 7, starting from the position illustrated in the figures, after a small pedal path according to the direction of the arrow 5, the auxiliary support 8 of the piston rod 2 comes to rest on the pedal lever 3, and with a further pivoting of the brake pedal 4 or pedal lever 3 according to the direction of the arrow 5, the piston rod 2 is displaced alone by way of the auxiliary support 8. In this case, the pedal ratio is clearly lower than in the case of the regularly effective support, so that, although the pedal force to be applied by the driver to the pedal plate 4b will rise noticeably, the pedal path required for a usual brake pressure buildup will simultaneously decrease to such an extent that it can still easily be implemented by the driver. To this extent, the failure behavior of the electromechanical brake power assist unit described here is similar to that of conventional vacuum brake power assist units. So that, in the case of such a system failure, the desired displacement of the piston rod 2 is not prevented by the pedal bolt or bolts 3c, the above briefly described guide link 2a is provided in the fork head of the piston rod 2. In this guide link 2a constructed as an oblong hole, the pedal bolt or bolts 3c can therefore be displaced after the activation of the auxiliary support 8, in which case, the brake pedal 4 is quasi overtaken by the piston rod 2.

In addition, deviating from the dimensioning nowadays customary for the case of a system failure in one of the two hydraulic brake circuits of the vehicle brake system following the master brake cylinder 1, not that pedal path should be made available that would occur in the event of a failure of both brake circuits of the brake system. Rather, it is sufficient in the present case to make the pedal path available for the failure of a single brake circuit because the pedal path for the second brake can be compensated by the electromechanical actuator or electric motor 7. The failure of both brake circuits and of the actuator does not have to be taken into account as a multiple fault.

Furthermore, referring to FIG. 2, a modification is shown here which quasi represents a brake booster as a unit which may, for example, be fastened on the face wall 12 of the vehicle foot well on the side facing away from the foot well and can interact with a brake pedal 4 arranged in a conventional manner. In this case, the same already explained structural members as in the first embodiment are marked by the same reference numbers. The housing 10 of the brake booster therefore corresponds to the supporting unit 10 of FIG. 1a, 1b. As easily recognizable, in the embodiment according to FIG. 2, the pedal lever 3 is an independent intermediate element that can be pivoted about the axis of rotation 3a and on which the piston rod 2 is supported. In this case, the axis of rotation can be displaced as explained above, and this pedal lever 3 can be pivoted about the axis of rotation 3a by way of the brake pedal 4. For this purpose, a transmission rod 14 is clamped between the pedal arm of the brake pedal 4 pivotably suspended by way of a bearing block 13 at the face wall 12 and the end of the pedal lever 3 situated opposite the axis of rotation 3a, or this transmission rod 14 mutually connects in an articulated manner the pedal lever 3 and the brake pedal 4 such that the pedal lever 3 is pivoted together with the brake pedal 4. Therefore, the force introduction point P at the pedal lever 3 mentioned in connection with FIG. 1 here corresponds to the linking point of this transmission rod 14 at the pedal lever 3.

FIG. 3 illustrates a modification of FIG. 2 as a further embodiment, in which case, a crank drive 15 is provided for the displacement of the axis of rotation 3a of the pedal lever 3 by way of the electric motor 7. By use of the crank drive or another suitable gearing with a variable gear ratio, high dynamics can be achieved at low forces, and a large transmission ratio can be achieved at high forces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electromechanical brake power assist unit for a vehicle braking system, comprising:
   a master brake cylinder having a piston rod;
   a brake pedal by which the piston rod is displaceable in order to build-up or reduce brake pressure, the brake pedal being pivotably suspended about an axis of rotation;
   a single electric motor by which the piston rod is also displaceable, the electric motor being activated as a function of a pedal path or a pivot angle of the brake pedal such that work applied by a driver to the brake pedal for the build-up of the brake pressure is less than work required without assistance by the electric motor for corresponding displacement of the piston rod;
   a pedal lever on which the piston rod is supported, the pedal lever being pivotable about an axis of rotation via the brake pedal,
   an auxiliary support provided at the pedal lever and/or at the piston rod, wherein
   the axis of rotation of the pedal lever is displaceable via the one electric motor substantially in a displacement direction of the piston rod of the master brake cylinder, and
   in an event of the failure of the electric motor or a linkage of the electric motor for displacing the pedal lever axis of rotation, the piston rod is supported on the pedal lever between the supporting point of the piston rod and the driver force introduction point upon a corresponding pivoting movement of the pedal lever.

2. The electromechanical brake power assist unit according to claim 1, wherein the pedal lever is formed by a portion of the brake pedal, in which case the axis of rotation of the pedal lever and the axis of rotation of the brake pedal coincide.

3. The electromechanical brake power assist unit according to claim 1, wherein the pedal lever is an intermediate element pivotable by the brake pedal, in which case the axis of rotation of the intermediate element differs from the axis of rotation of the brake pedal.

4. The electromechanical brake power assist unit according to claim 1, wherein a pedal ratio is configured to obtain a defined large pedal path in which no brake power assistance is necessary by way of an activation of the electric motor, which defined large pedal path, which is large because of the pedal ratio without the activation of the electric motor is reduced with the activation of the electric motor by a suitable displacement of the axis of rotation of the pedal lever; and wherein the pedal ratio is defined as a ratio of a distance between the pedal lever axis of rotation and a driver force introduction point to a distance between the pedal lever axis of rotation and a supporting point of the piston rod on the pedal lever, which supporting point is located on the pedal lever between the pedal lever axis of rotation and the driver force introduction point.

5. The electromechanical brake power assist unit according to claim 1, wherein the piston rod is supported on the pedal lever via a guide link.

6. The electromechanical brake power assist unit according to claim 2, wherein the piston rod is supported on the pedal lever via a guide link.

7. The electromechanical brake power assist unit according to claim 3, wherein the piston rod is supported on the pedal lever via a guide link.

8. The electromechanical brake power assist unit according to claim 1, further comprising:

a spindle drive configured to displace the axis of rotation of the pedal lever, the spindle drive being driven by the electric motor.

9. The electromechanical brake power assist unit according to claim 8, wherein the spindle drive is constructed as a ball screw.

10. The electromechanical brake power assist unit according to claim 1, further comprising:

a crank drive configured to displace the pedal lever axis of rotation, the crank drive being driven by the electric motor.

11. The electromechanical brake power assist unit according to claim 10, wherein the crank drive comprises a variable gear ratio.

\* \* \* \* \*